(12) United States Patent
Kanai et al.

(10) Patent No.: US 11,469,681 B2
(45) Date of Patent: Oct. 11, 2022

(54) POWER SUPPLY DEVICE

(71) Applicant: Neturen Co., Ltd., Tokyo (JP)

(72) Inventors: Takahiko Kanai, Tokyo (JP); Haruki Yoshida, Tokyo (JP)

(73) Assignee: Neturen Co., Ltd., Tokyo (JP)

( * ) Notice: Subject to any disclaimer, the term of this patent is extended or adjusted under 35 U.S.C. 154(b) by 0 days.

(21) Appl. No.: 17/386,907

(22) Filed: Jul. 28, 2021

(65) Prior Publication Data

US 2022/0038022 A1 Feb. 3, 2022

(30) Foreign Application Priority Data

Jul. 31, 2020 (JP) .............................. JP2020-130439

(51) Int. Cl.
| | |
|---|---|
| *H02M 7/49* | (2007.01) |
| *H02M 7/42* | (2006.01) |
| *H02M 7/00* | (2006.01) |
| *H02M 7/537* | (2006.01) |
| *H02M 5/458* | (2006.01) |
| *H02G 5/00* | (2006.01) |
| *H05B 6/04* | (2006.01) |

(52) U.S. Cl.
CPC ............ *H02M 7/003* (2013.01); *H02G 5/005* (2013.01); *H02M 5/4585* (2013.01); *H02M 7/49* (2013.01); *H02M 7/537* (2013.01); *H05B 6/04* (2013.01)

(58) Field of Classification Search
CPC ........ H02M 7/003; H02M 7/537; H02M 5/40; H02M 5/4585; H05B 6/04; H02G 5/005
See application file for complete search history.

(56) References Cited

U.S. PATENT DOCUMENTS

| | | | | |
|---|---|---|---|---|
| 9,270,102 | B2* | 2/2016 | Kikuchi | B60L 53/14 |
| 9,302,435 | B2* | 4/2016 | Hatori | H02M 7/003 |
| 10,897,795 | B2* | 1/2021 | Kanai | H05B 6/101 |
| 10,973,090 | B2* | 4/2021 | Kanai | H05B 6/04 |
| 11,218,080 | B2* | 1/2022 | Doo | H02G 5/005 |
| 2017/0179866 | A1* | 6/2017 | Murphy | B60R 16/03 |
| 2022/0014005 | A1* | 1/2022 | Luo | H02G 5/025 |

* cited by examiner

*Primary Examiner* — Gary L Laxton
(74) *Attorney, Agent, or Firm* — Rankin, Hill & Clark LLP (57) ABSTRACT

A power supply device includes a first output unit that outputs a first alternating current, a second output unit that outputs a second alternating current, and a current combining unit that combines the first alternating current and the second alternating current. The current combining unit includes a first bus bar, a second bus bar, a first conductive member welded to a first surface of the first bus bar and connected to the first output unit, a second conductive member that is welded to a second surface of the first bus bar, penetrates the second bus bar, and is connected to the second output unit, a third conductive member welded to a first surface of the second bus bar and connected to the second output unit, and a fourth conductive member that is welded to a second surface of the second bus bar, penetrates the first bus bar, and is connected to the first output unit. The second surface of the first bus bar faces the second surface of the second bus bar.

10 Claims, 10 Drawing Sheets

POWER SUPPLY DEVICE

BACKGROUND

Technical Field

Embodiments of the present invention relate to a power supply device.

Related Art

The induction heating device requires a power supply device that supplies high frequency power of a large current. In order for the power supply device to output a larger current, it is effective to connect a plurality of output circuits using a plurality of power semiconductors in parallel. On the other hand, the arrangement of the conductor through which a high frequency large current flows is restricted in order to reduce the inductance. Therefore, when a plurality of output circuits is provided, there is a problem that the power supply device is increased in size.

SUMMARY

An object of an embodiment of the present invention is to provide a power supply device that can be downsized.

A power supply device according to an embodiment of the present invention includes a first output unit that outputs a first alternating current, a second output unit that outputs a second alternating current, and a current combining unit that combines the first alternating current and the second alternating current. The current combining unit includes a first bus bar, a second bus bar, a first conductive member, a second conductive member, a third conductive member, and a fourth conductive member. The first conductive member is welded to a first surface of the first bus bar and connected to the first output unit. The second conductive member is welded to a second surface of the first bus bar, penetrates the second bus bar, and is connected to the second output unit. The third conductive member is welded to a first surface of the second bus bar and connected to the second output unit. The fourth conductive member is welded to a second surface of the second bus bar, penetrates the first bus bar, and is connected to the first output unit. The second surface of the first bus bar faces the second surface of the second bus bar.

According to the embodiment of the present invention, a power supply device that can be downsized can be realized.

DETAILED DESCRIPTION

First Embodiment

Hereinafter, an embodiment of the present invention will be described with reference to the drawings.

Figure 1:
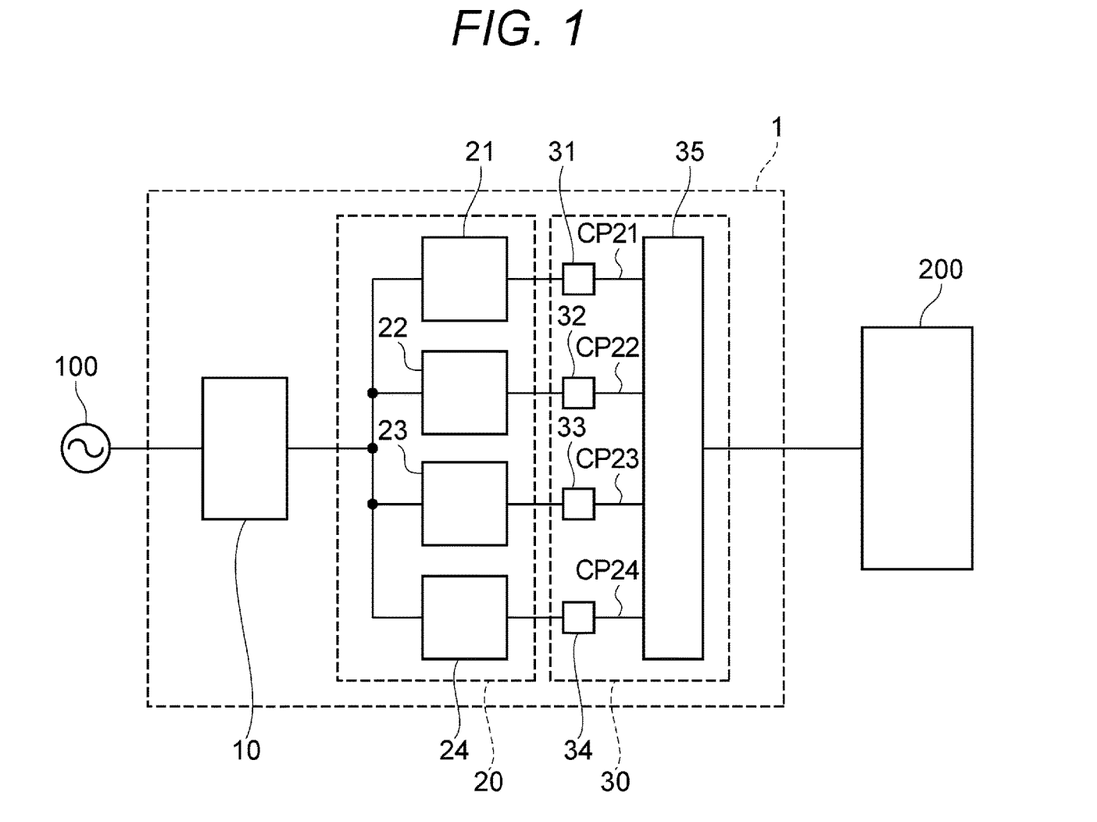
FIG. 1 is a block diagram illustrating a power supply device according to a first embodiment.

FIG. 1 is a block diagram illustrating a power supply device according to the present embodiment.

The power supply device 1 according to the present embodiment is, for example, a power supply of an induction heating device.

As illustrated in FIG. 1, the power supply device 1 according to the present embodiment is provided with a converter unit 10, an inverter unit 20, and a current combining unit 30. The converter unit 10 is connected to an external power supply, for example, a commercial AC power supply 100. The current combining unit 30 is connected to an external load 200. When the power supply device 1 is used as a power supply of the induction heating device, the external load 200 is a matching unit of the induction heating device. In the present specification, "connection" means electrical connection.

The converter unit 10 converts the alternating current supplied from the AC power supply 100 into a direct current and outputs the direct current to the inverter unit 20. The converter unit 10 is provided with, for example, a thyristor or a diode for rectifying an alternating current and a capacitor for smoothing the rectified current.

The inverter unit 20 converts the direct current supplied from the converter unit 10 into an alternating current of an arbitrary frequency and outputs the alternating current to the current combining unit 30. In the inverter unit 20, for example, four output units 21 to 24 are provided and connected in parallel to each other. However, the number of output units is not limited to four. The configurations of the output units 21 to 24 are the same as each other. Hereinafter, the configuration of the output unit 21 will be described as an example.

Figure 2:
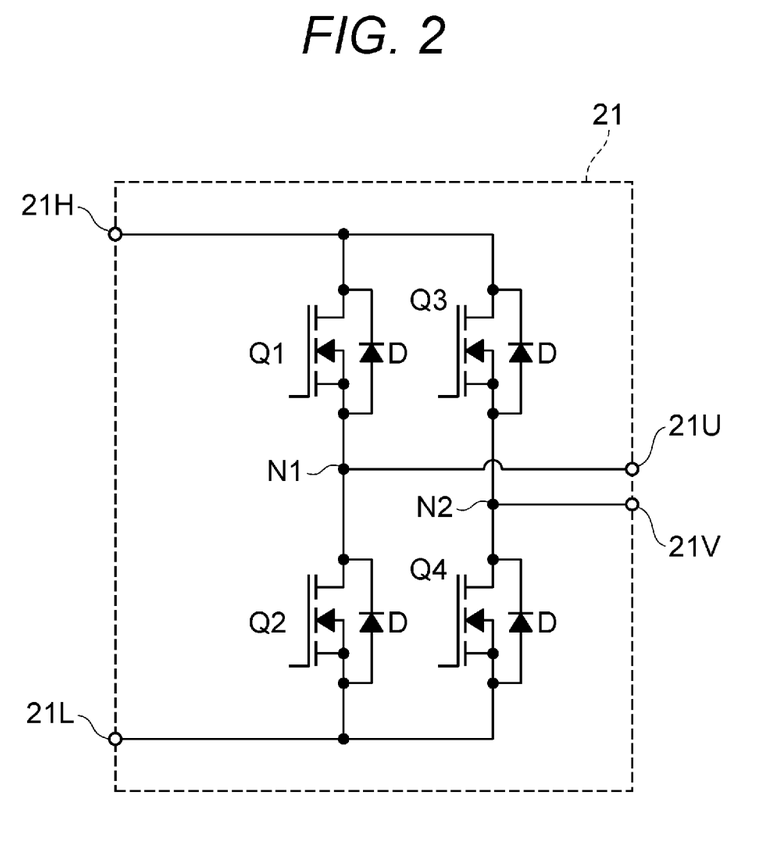
FIG. 2 is a circuit diagram illustrating one output unit in the first embodiment.

FIG. 2 is a circuit diagram illustrating one output unit in the present embodiment.

As illustrated in FIG. 2, four power semiconductor elements Q1 to Q4 are provided in the output unit 21. The power semiconductor elements Q1 to Q4 are switching elements to which two levels of potentials are input and capable of switching the output potential based on a control signal input from the outside, and are, for example, metal-oxide-semiconductor field-effect transistors (MOSFET) or insulated gate bipolar transistors (IGBT). A freewheeling diode D is connected in parallel to each of the power semiconductor elements Q1 to Q4.

In the output unit 21, the power semiconductor elements Q1 to Q4 configure a full bridge circuit. That is, the output unit 21 is provided with a high potential side terminal 21H and a low potential side terminal 21L to which a direct current is input from the converter unit 10, and a U terminal 21U and a V terminal 21V that output an alternating current to the current combining unit 30. The power semiconductor elements Q1 and Q2 are connected in series between the high potential side terminal 21H and the low potential side terminal 21L, and the power semiconductor elements Q3 and Q4 are also connected in series between the high potential side terminal 21H and the low potential side terminal 21L.

A node N1 between the power semiconductor element Q1 and the power semiconductor element Q2 is connected to the U terminal 21U, and a node N2 between the power semiconductor element Q3 and the power semiconductor element Q4 is connected to the V terminal 21V. A control signal is input from the outside to the gates of the power semiconductor elements Q1 to Q4. As a result, alternating current is output from the U terminal 21U and the V terminal 21V by alternately repeating a state in which the power semiconductor elements Q1 and Q4 are turned on and the power semiconductor elements Q2 and Q3 are turned off and a state in which the power semiconductor elements Q2 and Q3 are turned on and the power semiconductor elements Q1 and Q4 are turned off.

The current combining unit 30 combines the alternating currents respectively output from the output units 21 to 24 (hereinafter, also collectively and simply referred to as an "output unit") of the inverter unit 20. As illustrated in FIG. 1, the current combining unit 30 is provided with inductance adjustment units 31 to 34 and a conductor portion 35. The conductor portion 35 is connected to the U terminal 21U and the V terminal 21V of the output unit 21, and receives the alternating current output from the output unit 21. Similarly, the alternating currents output from the output units 22, 23, and 24 are input to the conductor portion 35.

The inductance adjustment unit 31 is interposed in a current path CP21 between the output unit 21 and the conductor portion 35. The inductance adjustment unit 32 is interposed in a current path CP22 between the output unit 22 and the conductor portion 35. The inductance adjustment unit 33 is interposed in a current path CP23 between the output unit 23 and the conductor portion 35. The inductance adjustment unit 34 is interposed in a current path CP24 between the output unit 24 and the conductor portion 35.

Figure 3:
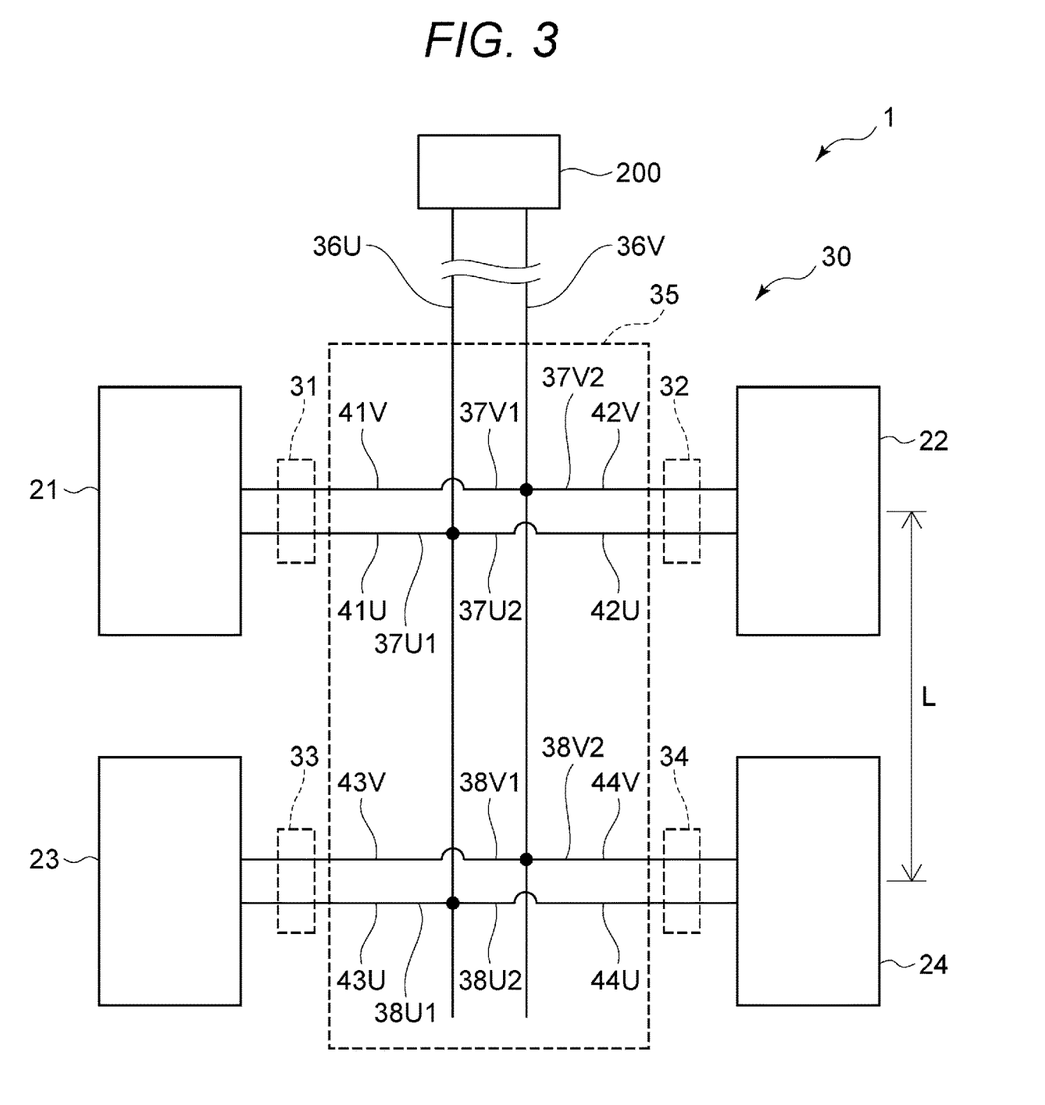
FIG. 3 is a diagram illustrating a positional relationship between components of an inverter unit and a current combining unit of the power supply device according to the first embodiment.

FIG. 3 is a diagram illustrating a positional relationship between components of the inverter unit and the current combining unit of the power supply device according to the present embodiment.

Figure 4:
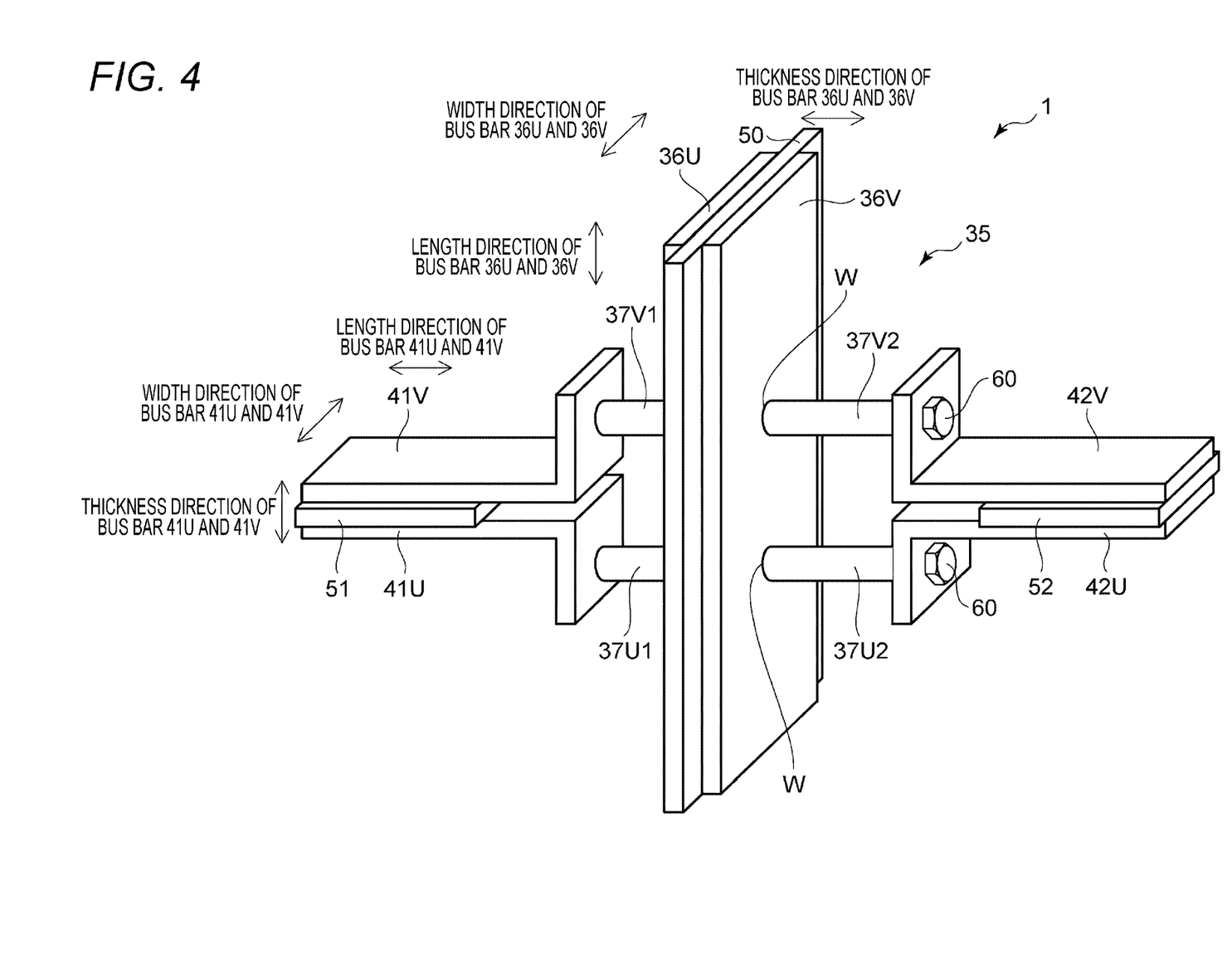
FIG. 4 is a perspective view illustrating a part of a conductor portion in the first embodiment.

FIG. 4 is a perspective view illustrating a part of the conductor portion in the present embodiment.

Figure 5:
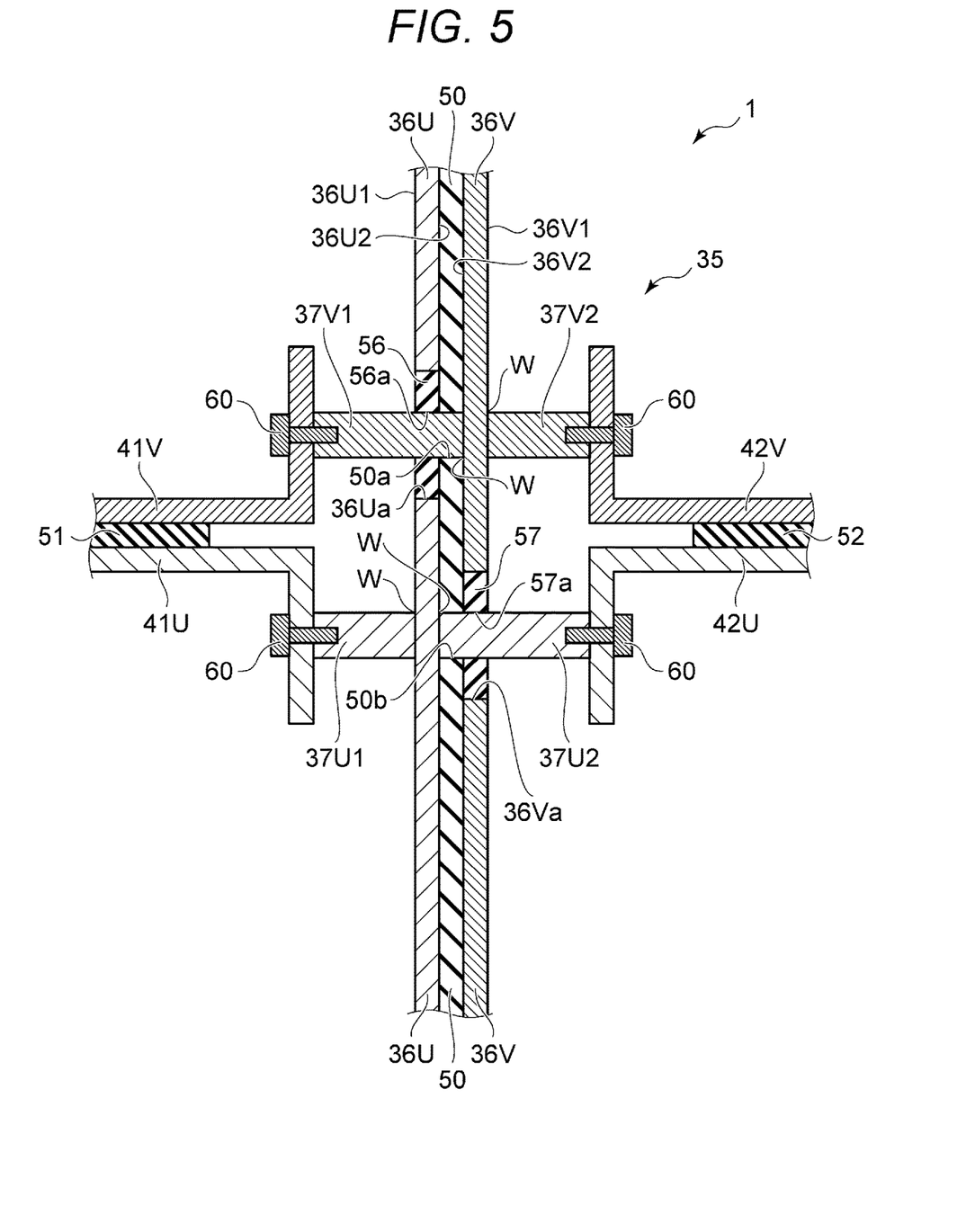
FIG. 5 is a cross-sectional view illustrating a part of a conductor portion in the first embodiment.

FIG. 5 is a cross-sectional view illustrating a part of the conductor portion in the present embodiment.

As illustrated in FIGS. 3 to 5, the conductor portion 35 is provided with a pair of bus bars 36U and 36V. The bus bars 36U and 36V (hereinafter, also collectively and simply referred to as a "bus bar") are made of a metal material having high conductivity such as copper, and have a band-like shape. The bus bars 36U and 36V have a thickness of, for example, about 3 mm and a width of, for example, about 200 mm, and extend in one direction, for example, the vertical (length) direction. The length of bus bars 36U and 36V is, for example, about 2000 mm. Main surfaces of the bus bar 36U are a first surface 36U1 and a second surface 36U2. Main surfaces of the bus bar 36V are a first surface 36V1 and a second surface 36V2. The second surface 36U2 of the bus bar 36U faces the second surface 36V2 of the bus bar 36V The bus bars 36U and 36V are connected to an external load 200, for example, a matching unit of an induction heating device.

The pair of bus bars 36U and 36V is laminated on both surfaces of the insulating sheet 50. That is, the insulating sheet 50 is disposed between the bus bar 36U and the bus bar 36V, and is in contact with the second surface 36U2 of the bus bar 36U and the second surface 36V2 of the bus bar 36V.

As a result, the bus bar 36U and the bus bar 36V are insulated from each other at a certain distance, and are disposed at sufficiently close positions, so that generation of inductance is suppressed. The insulating sheet 50 is formed of, for example, an insulating material such as epoxy glass or Teflon (registered trademark, polytetrafluoroethylene). The width and length of the insulating sheet 50 are wider than the width and length of the bus bars 36U and 36V, and both side portions of the insulating sheet 50 in the width direction and the length direction protrude from both end edges of the bus bars 36U and 36V in the width direction and the length direction. As a result, the creepage distance between the bus bar 36U and the bus bar 36V becomes long, and the bus bar 36U and the bus bar 36V are reliably insulated. The thickness of the insulating sheet 50 is, for example, about 2 mm.

In the conductor portion 35, four pairs of conductive members 37U1 and 37U2, 37V1 and 37V2, 38U1 and 38U2, and 38V1 and 38V2 are provided as conductive members. When viewed from the lamination direction of the bus bars 36U and 36V, the conductive member 37U1 overlaps the conductive member 37U2, the conductive member 37V1 overlaps the conductive member 37V2, the conductive member 38U1 overlaps the conductive member 38U2, and the conductive member 38V1 overlaps the conductive member 38V2. The conductive members 37U1 and 37U2, 37V1 and 37V2, 38U1 and 38U2, and 38V1 and 38V2 (hereinafter, also collectively and simply referred to as a "conductive member") are formed of, for example, copper.

One end portion of the conductive member 37U1 is welded to the first surface 36U1 of the bus bar 36U. One end portion of the conductive member 37U2 is welded to the second surface 36U2 of the bus bar 36U. One end portion of the conductive member 37V1 is welded to the second surface 36V2 of the bus bar 36V One end portion of the conductive member 37V2 is welded to the first surface 36V1 of the bus bar 36V. As a result, the welded portion W is formed in at least a part of the contact portion between each bus bar and each conductive member.

Further, in the conductor portion 35, four pairs of branch bus bars 41U and 41V, 42U and 42V, 43U and 43V, and 44U and 44V are provided. The shapes of the branch bus bars 41U and 41V, 42U and 42V, 43U and 43V, and 44U and 44V (hereinafter, also collectively referred to simply as a "branch bus bar") are, for example, a band shape in which one end portion is bent in an L shape.

The branch bus bar 41U is connected to the other end portion of the conductive member 37U1. As a result, the branch bus bar 41U is connected to the bus bar 36U via the conductive member 37U1. The branch bus bar 41V is connected to the other end of the conductive member 37V1. As a result, the branch bus bar 41V is connected to the bus bar 36V via the conductive member 37V1. The branch bus bar 42U is connected to the other end of the conductive member 37U2. As a result, the branch bus bar 42U is connected to the bus bar 36U via the conductive member 37U2. The branch bus bar 42V is connected to the other end of the conductive member 37V2. As a result, the branch bus bar 42V is connected to the bus bar 36V via the conductive member 37V2.

Similarly, the branch bus bar 43U is connected to the bus bar 36U via the conductive member 38U1. The branch bus bar 43V is connected to the bus bar 36V via the conductive member 38V1. The branch bus bar 44U is connected to the bus bar 36U via the conductive member 38U2. The branch bus bar 44V is connected to the bus bar 36V via the conductive member 38V2. Each of the branch bus bars and each of the conductive members may be connected by a screw 60, may be welded, or may be connected by other means.

An insulating sheet 51 is provided between the branch bus bar 41U and the branch bus bar 41V forming a pair. The branch bus bar 41U and the branch bus bar 41V are laminated on both sides of the insulating sheet 51, thereby being insulated from each other while maintaining a certain distance. The width and length of the insulating sheet 51 are wider than the width and length of the branch bus bars 41U and 41V, and both side portions of the insulating sheet 51 in the width direction and the length direction protrude from both end edges of the branch bus bars 41U and 41V in the width direction and the length direction. As a result, the creepage distance between the branch bus bar 41U and the branch bus bar 41V is increased, and the branch bus bar 41U and the branch bus bar 41V are reliably insulated. The thickness of the insulating sheet 51 is, for example, about 2 mm.

Similarly, an insulating sheet 52 is provided between the pair of branch bus bars 42U and 42V, an insulating sheet 53 (see FIG. 6B) is provided between the pair of branch bus bars 43U and 43V, and an insulating sheet (not illustrated) is provided between the pair of branch bus bars 44U and 44V. Similarly to the insulating sheet 50, these insulating sheets are also formed of, for example, an insulating material such as epoxy glass or Teflon (registered trademark).

Hereinafter, a mechanical configuration of a connection portion between the bus bars 36U and 36V and the branch bus bars 41U and 41V, and 42U and 42V will be described. The mechanical configuration of the connection portion between the bus bars 36U and 36V and the branch bus bars 43U and 43V, and 44U and 44V is also similar to the following description.

A hole 50a and a hole 50b are formed in the insulating sheet 50. The holes 50a and 50b have a circular shape and penetrate the insulating sheet 50 in the thickness direction. The diameters of the holes 50a and 50b of the insulating sheet 50 are slightly larger than the outer diameter of the conductive member.

A hole 36Ua is formed in the bus bar 36U. The hole 36Ua has a circular shape and penetrates the bus bar 36U in the thickness direction. The diameter of the hole 36Ua is larger than the outer diameter of the conductive member. A hole 36Va is formed in the bus bar 36V. The hole 36Va has a circular shape and penetrates the bus bar 36V in the thickness direction. The diameter of the hole 36Va is larger than the outer diameter of the conductive member. The diameter of the hole 36Ua of the bus bar 36U is substantially equal to the diameter of the hole 36Va of the bus bar 36V.

In the hole 36Ua of the bus bar 36U, an annular insulating washer 56 is provided as an insulating member. Hole 56a is formed in a center portion of the insulating washer 56. The conductive member 37V1 penetrates the hole 50a of the insulating sheet 50 and the hole 56a of the insulating washer 56. Thus, the conductive member 37V1 is insulated from the bus bar 36U.

In the hole 36Va of the bus bar 36V, an annular insulating washer 57 is provided as an insulating member. Hole 57a is formed in a center portion of the insulating washer 57. The conductive member 37U2 penetrates the hole 50b of the insulating sheet 50 and the hole 57a of the insulating washer 57. Thus, the conductive member 37U2 is insulated from the bus bar 36V. Insulating washers 56 and 57 are made of, for example, an insulating material such as epoxy glass or Teflon (registered trademark).

In this manner, the bus bar 36U is connected to the branch bus bar 41U and the branch bus bar 42U. On the other hand, the bus bar 36U is insulated from the bus bar 36V by the insulating sheet 50, and is insulated from the conductive member 37V1 by the insulating washer 56. The bus bar 36V is connected to the branch bus bar 42V and the branch bus bar 41V. On the other hand, the bus bar 36V is insulated from the bus bar 36U by the insulating sheet 50, and is insulated from the conductive member 37U2 by the insulating washer 57.

As a result, the U terminals can be taken out to both sides in the lamination direction of the bus bars 36U and 36V via the conductive members 37U1 and 37U2, and the V terminals can be taken out to both sides in the lamination direction of the bus bars 36U and 36V via the conductive members 37V1 and 37V2. As a result, the output unit 21 and the output unit 22 can be arranged on both sides in the lamination direction of the bus bars 36U and 36V At this time, in the lamination direction of the bus bars 36U and 36V, the bus bars 36U and 36V are arranged between the output unit 21 and the output unit 22.

For example, the output unit 21 and the output unit 22 can be disposed at symmetrical positions with respect to the insulating sheet 50 with the bus bars 36U and 36V interposed therebetween. In this case, the length of the current path CP21 from the output unit 21 to the external load 200 (for example, a matching unit of the induction heating device) and the length of the current path CP22 from the output unit 22 to the external load 200 can be made equal, and the inductance of the current path CP21 and the inductance of the current path CP22 can be made substantially equal.

With a similar configuration, the U terminal can be taken out to both sides in the lamination direction of the bus bars 36U and 36V via the conductive members 38U1 and 38U2, and the V terminal can be taken out to both sides in the lamination direction of the bus bars 36U and 36V via the conductive members 38V1 and 38V2. As a result, the output unit 23 and the output unit 24 can be arranged on both sides in the lamination direction of the bus bars 36U and 36V. At this time, in the lamination direction of the bus bars 36U and 36V, the bus bars 36U and 36V are arranged between the output unit 23 and the output unit 24.

For example, the output unit 23 and the output unit 24 can be disposed at symmetrical positions with respect to the insulating sheet 50 with the bus bars 36U and 36V interposed therebetween. In this case, the length of the current path CP23 from the output unit 23 to the external load 200 and the length of the current path CP24 from the output unit 24 to the external load 200 can be made equal, and the inductance of the current path CP23 and the inductance of the current path CP24 can be made substantially equal.

For example, the output units 21 to 24 can be arranged in a matrix of two rows and two columns when viewed from the width direction of the bus bar 36U. In this case, when viewed from the lamination direction of the bus bars 36U and 36V, the output unit 21 overlaps the output unit 22, and the output unit 23 overlaps the output unit 24. In addition, when viewed in the direction in which the bus bars 36U and 36V extend, for example, the vertical direction, the output unit 21 overlaps the output unit 23, and the output unit 22 overlaps the output unit 24.

As described above, in the present embodiment, the length of the current path CP21 from the output unit 21 to the external load 200 can be made substantially equal to the length of the current path CP22 from the output unit 22 to the external load 200. As a result, the inductances of these current paths can be made substantially equal. In addition, the length of the current path CP23 from the output unit 23 to the external load 200 can be substantially equal to the length of the current path CP24 from the output unit 24 to the external load 200. As a result, the inductances of these current paths can be made substantially equal. However, as illustrated in FIG. 3, the current path CP23 from the output unit 23 to the external load 200 is longer than the current path CP21 from the output unit 21 to the external load 200 by a distance L, and the inductance is correspondingly larger.

Therefore, in the present embodiment, the inductance adjustment units 31 to 34 are provided between the output unit 21 to 24 and each of the bus bars 36U and 36V in order to equalize the inductance of the current path from each output unit to the external load 200. For example, an inductance corresponding to the distance L is added to the current path CP21 and the current path CP22, and the inductances of these current paths are made substantially equal to the inductance of the current path CP23 and the inductance of the current path CP24. As a result, the currents flowing through the respective output units are equalized, and the loads on the respective output units are equalized. As a result, the calorific value of each output unit is made uniform, and it is possible to avoid a significant reduction in the life of a specific output unit. In addition, by making the inductances of the current paths CP21 to CP24 equal to each other, it is possible to align the phases of the high frequency currents output from the respective output units and suppress the loss.

Figure 6A:
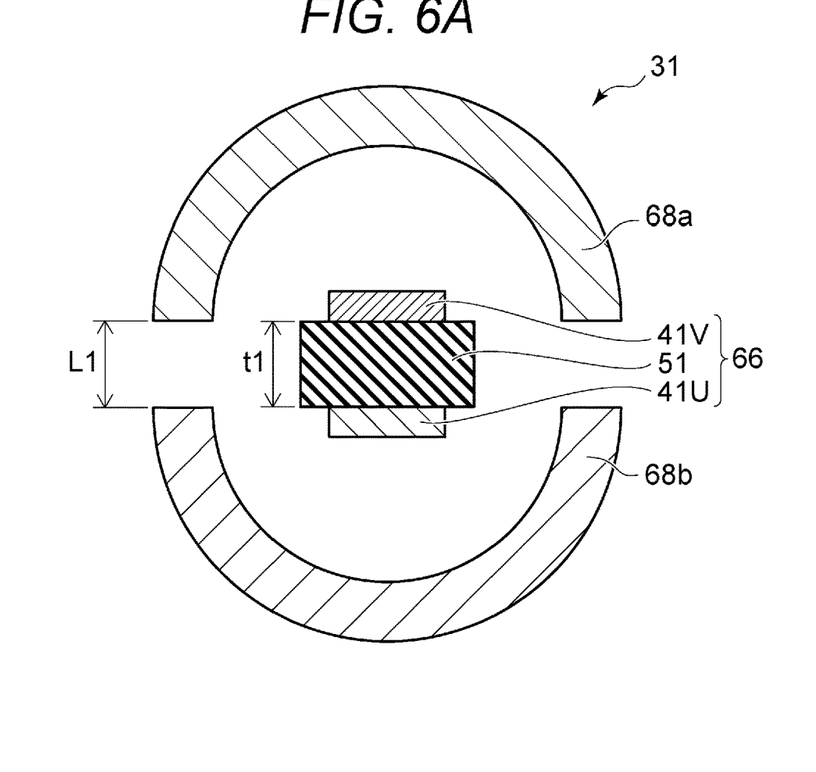
FIGS. 6A and 6B are cross-sectional views illustrating an inductance adjustment unit in the first embodiment.
Figure 6B:
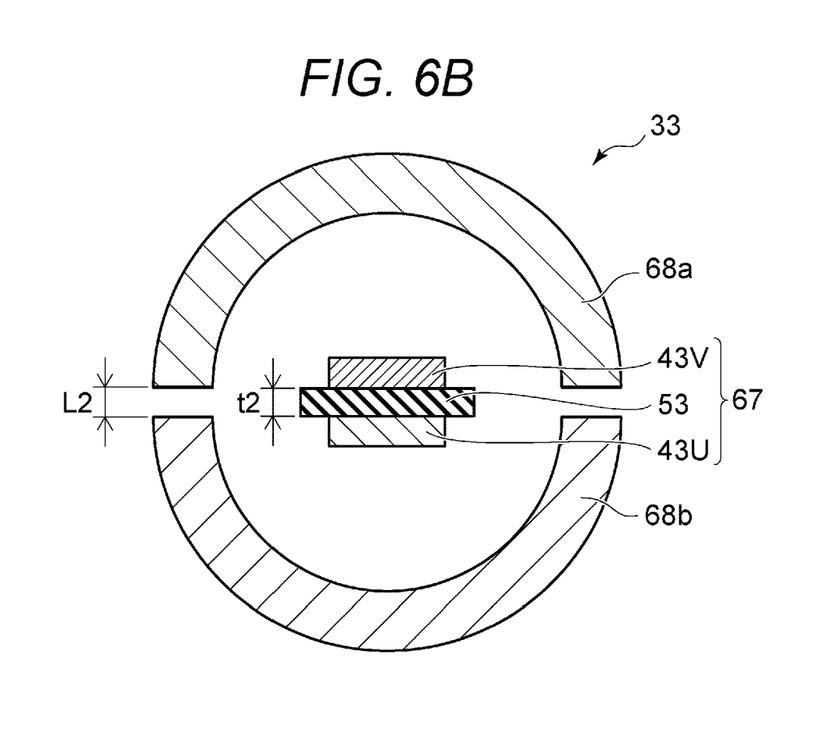

FIGS. 6A and 6B are cross-sectional views illustrating an inductance adjustment unit in the present embodiment.

As illustrated in FIG. 6A, the inductance adjustment unit 31 is provided with a laminated body 66 including a branch bus bar 41U, an insulating sheet 51, and a branch bus bar 41V. The branch bus bar 41U and the branch bus bar 41V are separated from each other by a thickness t1 of the insulating sheet 51. The configuration of the inductance adjustment unit 32 is similar to the configuration of the inductance adjustment unit 31.

As illustrated in FIG. 6B, the inductance adjustment unit 33 is provided with a laminated body 67 including a branch bus bar 43U, an insulating sheet 53, and a branch bus bar 43V. The branch bus bar 43U and the branch bus bar 43V are separated from each other by a thickness t2 of the insulating sheet 53. The thickness t2 is smaller than the thickness t1. The configuration of the inductance adjustment unit 34 is similar to the configuration of the inductance adjustment unit 33.

The thicker the insulating sheet, the larger the inductance applied to the branch bus bars disposed on both sides of the insulating sheet. Therefore, the inductance added to the branch bus bars 41U and 41V by the inductance adjustment unit 31 is larger than the inductance added to the branch bus bars 43U and 43V by the inductance adjustment unit 33. Therefore, the inductance added to the current path CP21 by the inductance adjustment unit 31 and the inductance added to the current path CP22 by the inductance adjustment unit 32 are larger than the inductance added to the current path CP23 by the inductance adjustment unit 33 and the inductance added to the current path CP24 by the inductance adjustment unit 34. In this manner, the inductance adjustment unit 31 to 34 can compensate for the difference in the length of the current path and equalize the inductances of the current paths CP21 to CP24.

In addition, a pair of core members 68a and 68b is provided around the laminated body 66, and a pair of core members 68a and 68b is also provided around the laminated body 67. The core members 68a and 68b are formed of, for example, a magnetic body, and have a semi-annular shape. The core member 68a and the core member 68b arranged around the laminated body 66 are separated by a distance L1. The core member 68a and the core member 68b arranged around the laminated body 67 are separated by a distance L2. The distance L2 is shorter than the distance L1. By providing the core members 68a and 68b, it is possible to suppress variations in current between the branch bus bar 41U and the branch bus bar 41V forming a pair and variations in current between the branch bus bars 43U and 43V forming a pair. Note that a core member connecting the core member 68a and the core member 68b may be provided.

Next, effects of the present embodiment will be described.

In the power supply device 1 according to the present embodiment, by welding the conductive member to both surfaces of each bus bar, the U terminal and the V terminal can be taken out from the pair of bus bars 36U and 36V to both sides in the lamination direction of the bus bars 36U and 36V. As a result, the pair of output units 21 and 22 can be arranged on both sides in the lamination direction of the bus bars 36U and 36V, and the pair of output units 21 and 22 can be connected to both the bus bars 36U and 36V by a simple current path. Therefore, even if a plurality of output units is provided, the power supply device 1 can be downsized.

As illustrated in FIG. 3, in the power supply device 1, four output units 21 to 24 can be provided, two output units can be arranged on each side in the lamination direction of the bus bars 36U and 36V, and two output units can be arranged in two stages in the vertical direction. As a result, it is possible to suppress the height of the power supply device 1 while suppressing the installation area of the power supply device 1. In a case where the power supply device 1 is installed in a factory as a power supply of an induction heating device, an installation area is often limited, and a height is also limited. Even in such a case, the power supply device 1 according to the present embodiment can be installed without taking any special measures.

On the other hand, if the terminals cannot be taken out to both sides of the bus bar, the U terminal is taken out to the opposite side of the bus bar 36V from the bus bar 36U, and the V terminal is taken out to the opposite side of the bus bar 36U from the bus bar 36V In this case, since the U terminal and the V terminal are extracted in opposite directions to each other, the configuration of the current path becomes complicated. In order to flow a high frequency large current, it is necessary to maintain the cross-sectional area at a certain value or more over the entire length of the current path, so that the bus bar is connected to configure the current path. In addition, in order to suppress the inductance between the bus bars, the U-phase bus bar and the V-phase bus bar need to be disposed at positions as close as possible while being insulated from each other. Furthermore, in order to suppress the loss of the high-frequency current, it is preferable that the bending of the current path is small. When the current path is configured to satisfy the above requirements, the arrangement of the output unit is restricted, a dead space is generated in the power supply device, and downsizing of the power supply device becomes difficult.

In the power supply device 1, since the length of the current path CP21 from the output unit 21 to the external load 200 is substantially the same as the length of the current path CP22 from the output unit 22 to the external load 200, the configuration of the inductance adjustment unit 31 and the configuration of the inductance adjustment unit 32 can be the same. In addition, since the length of the current path CP23 from the output unit 23 to the external load 200 is substantially the same as the length of the current path CP24 from the output unit 24 to the external load 200, the configuration of the inductance adjustment unit 33 and the configuration of the inductance adjustment unit 34 can be the same. As a result, the components of the inductance adjustment unit can be standardized, and the cost can be reduced. On the other hand, if the lengths of the current paths from the output units to the external load are different from each other, it is necessary to make the inductances added by the inductance adjustment units different from each other, and thus it is difficult to standardize the components.

Second Embodiment

Next, a second embodiment will be described.

Figure 7:
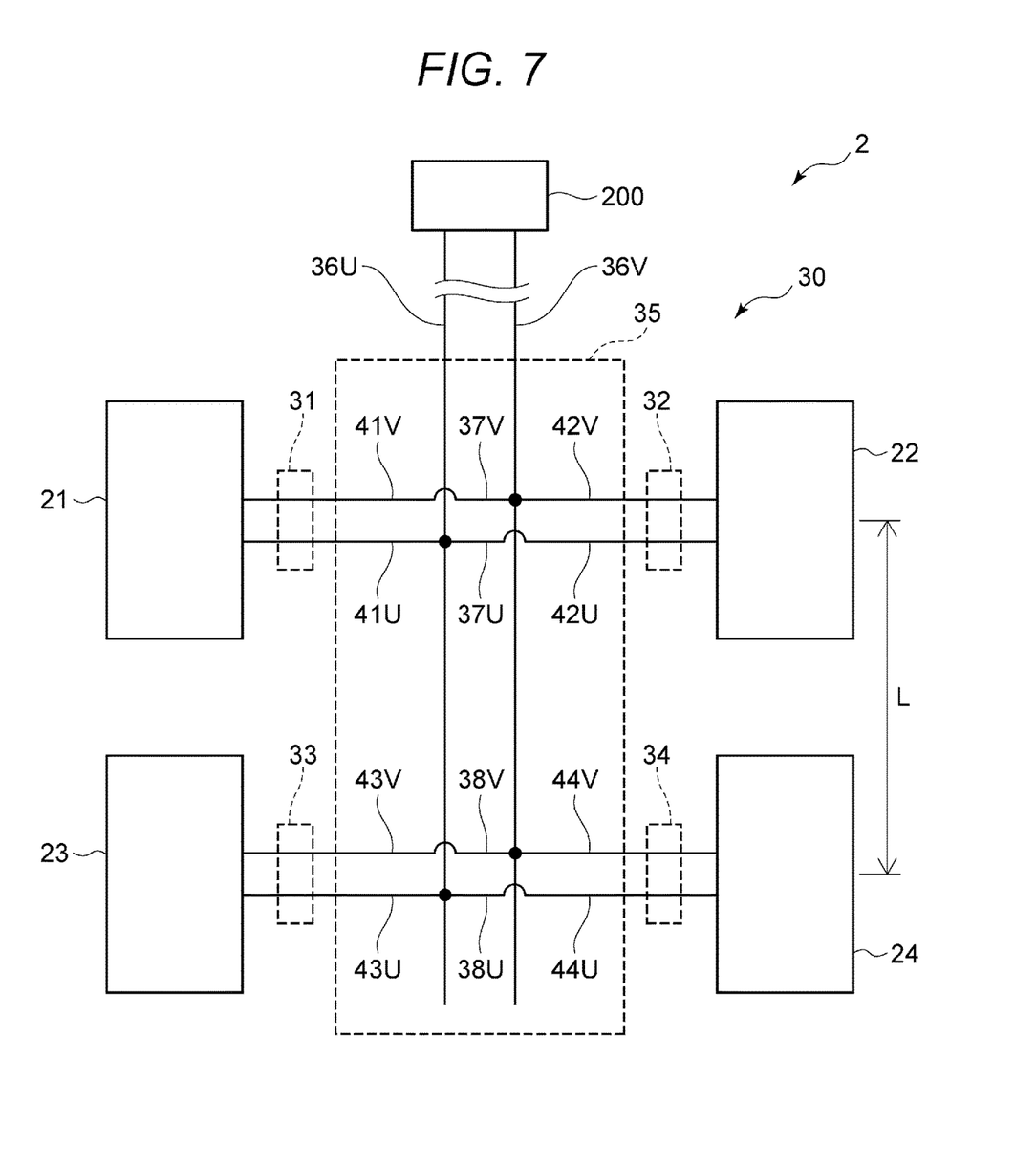
FIG. 7 is a diagram illustrating a positional relationship between components of an inverter unit and a current combining unit of a power supply device according to a second embodiment.

FIG. 7 is a diagram illustrating a positional relationship between components of an inverter unit and a current combining unit of a power supply device according to the present embodiment.

Figure 8:
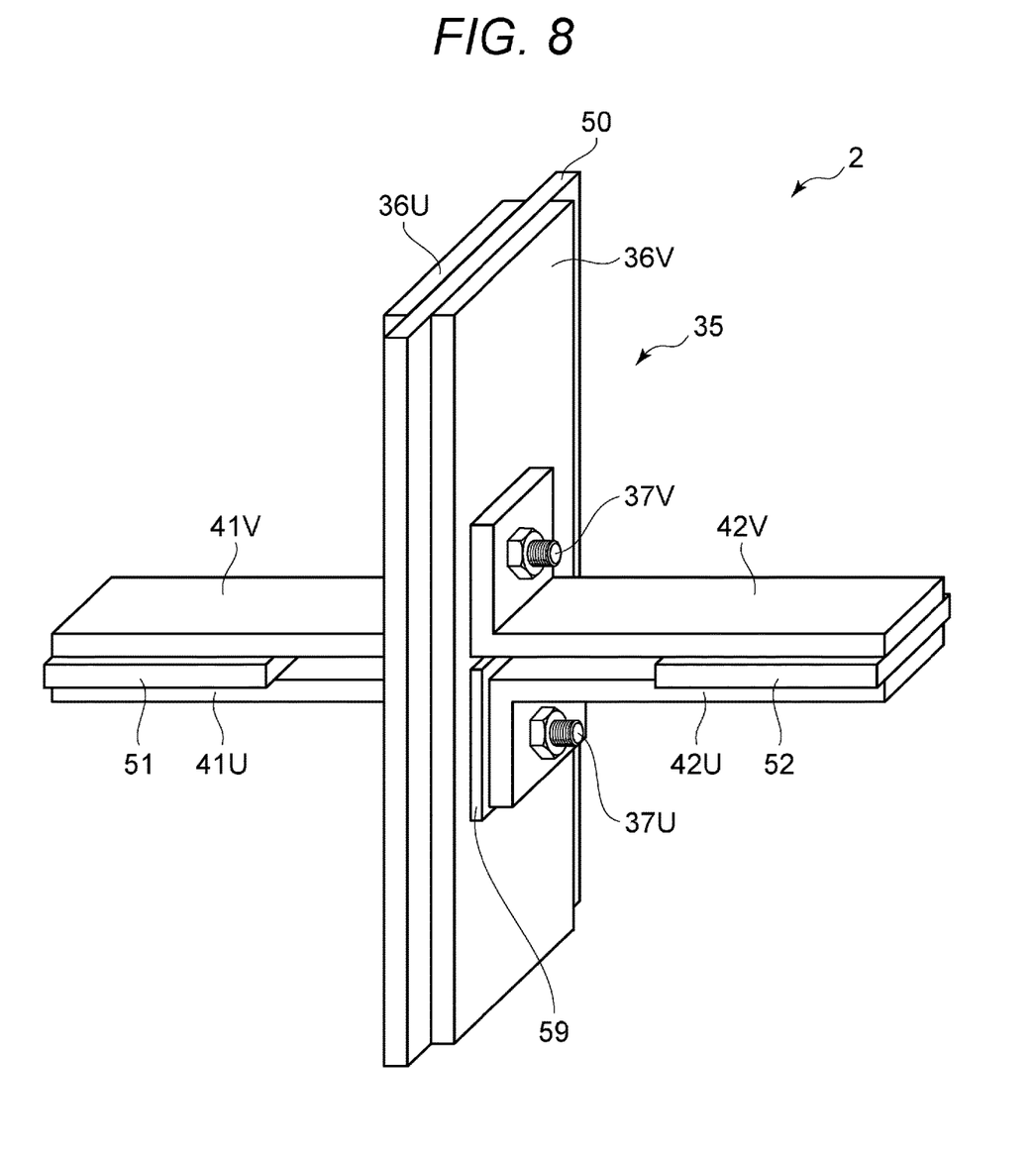
FIG. 8 is a perspective view illustrating a part of a conductor portion in a second embodiment.

FIG. 8 is a perspective view illustrating a part of a conductor portion in the present embodiment.

Figure 9:
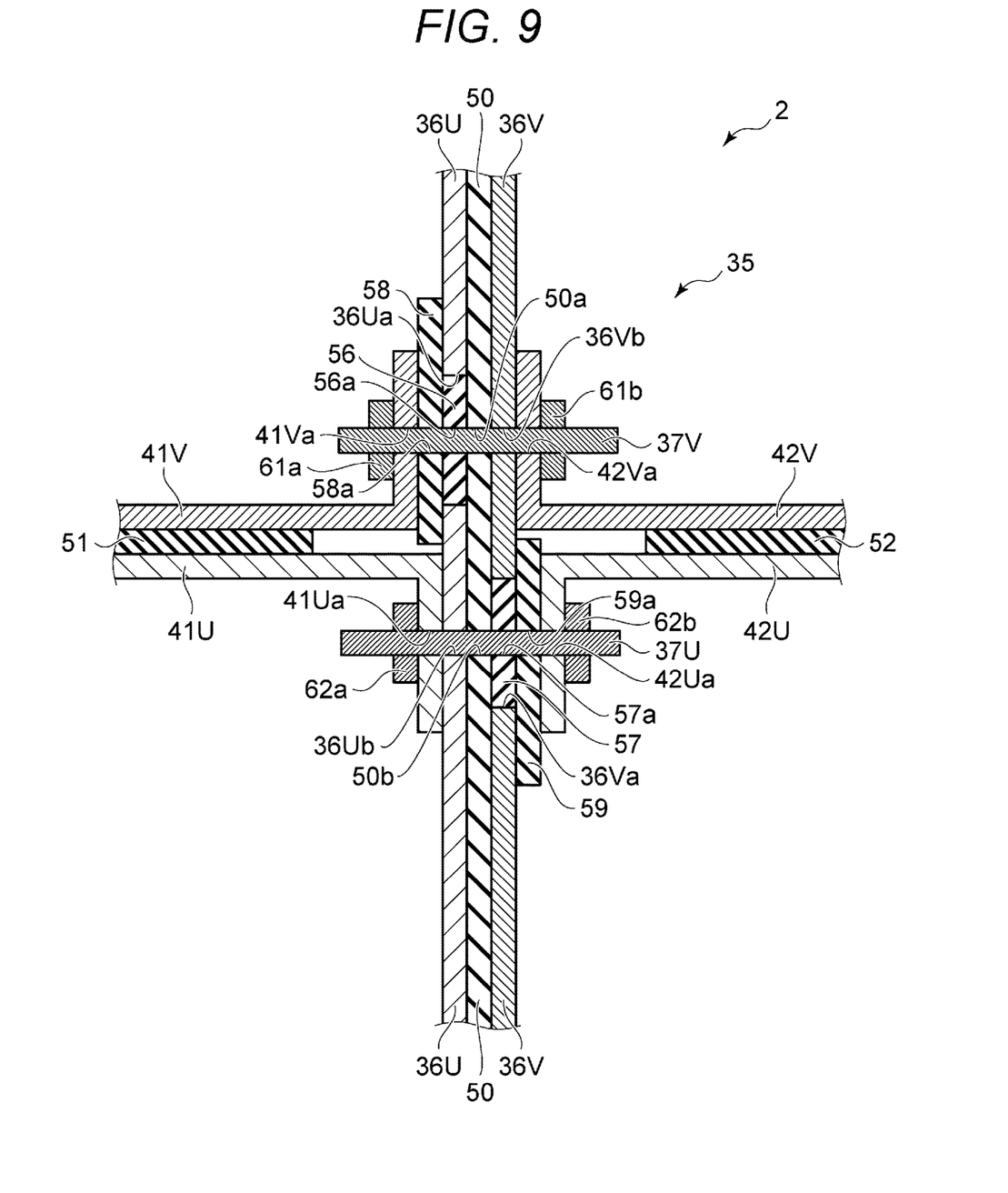
FIG. 9 is a cross-sectional view illustrating a part of a conductor portion in a second embodiment.

FIG. 9 is a cross-sectional view illustrating a part of the conductor portion in the present embodiment.

Figure 10:
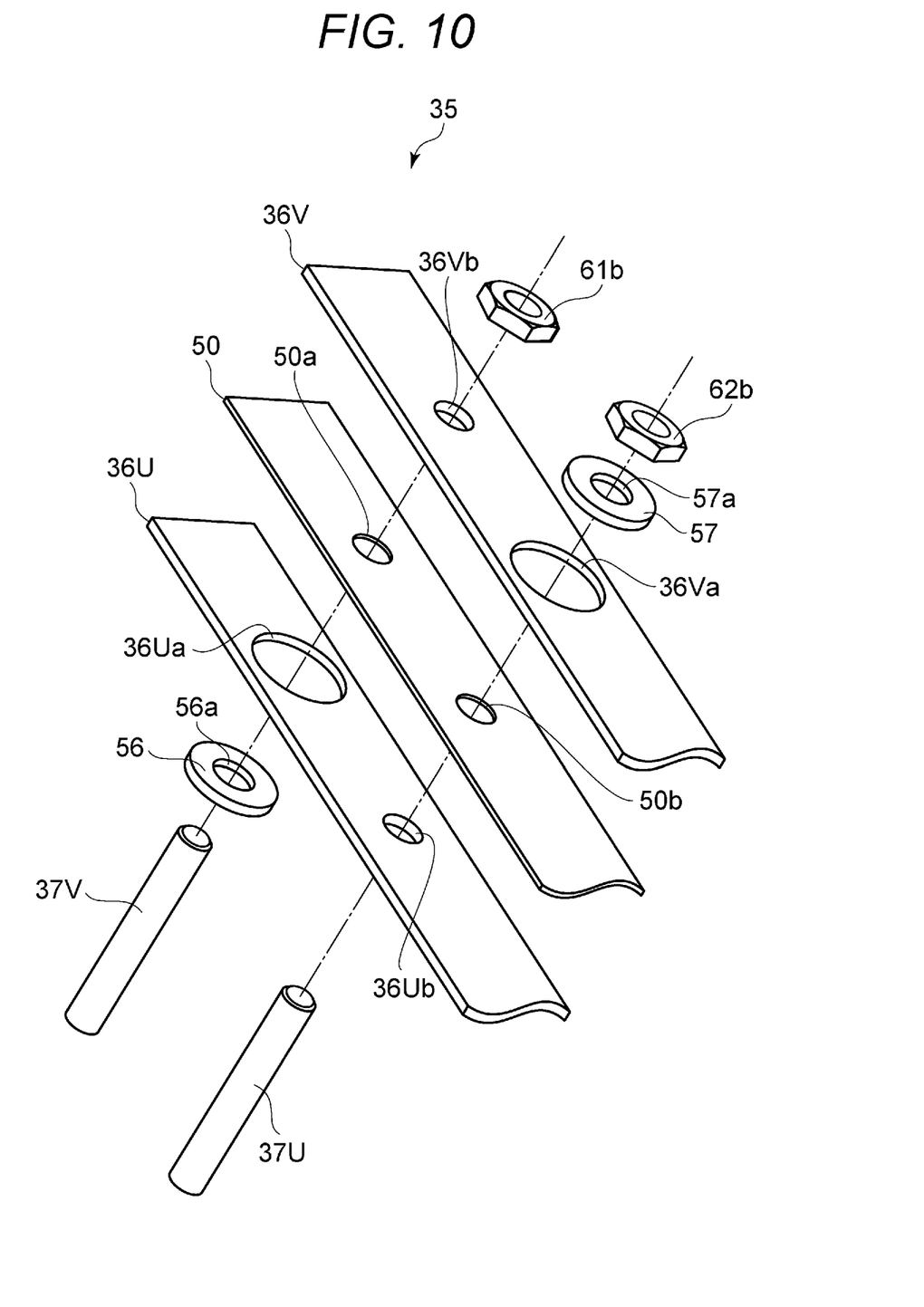
FIG. 10 is a perspective exploded view illustrating a part of a conductor portion in a second embodiment.

FIG. 10 is a perspective exploded view illustrating a part of the conductor portion in the present embodiment.

As illustrated in FIGS. 7 to 10, the power supply device 2 according to the present embodiment is different from the power supply device 1 according to the first embodiment (see FIGS. 1 to 6B) in the mechanical configuration of the conductor portion 35 of the current combining unit 30. The electrical connection relationship between each bus bar and each branch bus bar in the present embodiment is the same as that in the first embodiment.

In the conductor portion 35 of the power supply device 2, two pairs of conductive members 37U and 37V, and 38U and 38V (hereinafter, also collectively and simply referred to as a "conductive member") are provided. In the conductor portion 35, similarly to the first embodiment, four pairs of branch bus bars 41U and 41V, 42U and 42V, 43U and 43V, and 44U and 44V are provided. In FIG. 10, illustration of the branch bus bar is omitted.

The branch bus bar 41U is connected to the bus bar 36U. The branch bus bar 41V is connected to the bus bar 36V via the conductive member 37V The branch bus bar 42U is connected to the bus bar 36U via the conductive member 37U. The branch bus bar 42V is connected to the bus bar 36V. The branch bus bar 43U is connected to the bus bar 36U. The branch bus bar 43V is connected to the bus bar 36V via the conductive member 38V The branch bus bar 44U is connected to the bus bar 36U via the conductive member 38U. The branch bus bar 44V is connected to the bus bar 36V.

In the present embodiment, two pairs of conductive members 37U and 37V, and 38U and 38V, and four pairs of branch bus bars 41U and 41V, 42U and 42V, 43U and 43V, and 44U and 44V are provided for the four output units 21 to 24. More generally speaking, when the number of output units is n (n is an even number of 2 or more), (n/2) pairs of conductive members are provided, and n pairs of branch bus bars are provided. When the number of output units is m (m is an odd number of 3 or more), {(m+1)/2} pairs of conductive members are provided, and m pairs of branch bus bars are provided.

Hereinafter, a mechanical configuration of a connection portion between the bus bars 36U and 36V and the branch bus bars 41U and 41V, and 42U and 42V will be described. The mechanical configuration of the connection portion between the bus bars 36U and 36V and the branch bus bars 43U and 43V, and 44U and 44V is also similar to the following description.

A hole 36Ua and a hole 36Ub are formed in the bus bar 36U. The holes 36Ua and 36Ub have a circular shape and penetrate the bus bar 36U in the thickness direction. The diameter of the hole 36Ua is larger than the diameter of the hole 36Ub. A hole 36Va and a hole 36Vb are formed in the bus bar 36V The holes 36Va and 36Vb have a circular shape and penetrate the bus bar 36V in the thickness direction. The diameter of the hole 36Va is larger than the diameter of the hole 36Vb. The diameter of the hole 36Ua of the bus bar 36U is substantially equal to the diameter of the hole 36Va of the bus bar 36V. The diameter of the hole 36Ub of the bus bar 36U is substantially equal to the diameter of the hole 36Vb of the bus bar 36V.

A hole 50a and a hole 50b are formed in the insulating sheet 50. The holes 50a and 50b have a circular shape and penetrate the insulating sheet 50 in the thickness direction. The diameters of the holes 50a and 50b of the insulating sheet 50 are substantially equal to the diameter of the hole 36Ub of the bus bar 36U and the diameter of the hole 36Vb of the bus bar 36V, and are slightly larger than the outer diameter of the conductive member.

In the hole 36Ua of the bus bar 36U, an annular insulating washer 56 is provided as an insulating member. Hole 56a is formed in a center portion of the insulating washer 56. In the hole 36Va of the bus bar 36V, an annular insulating washer 57 is provided as an insulating member. Hole 57a is formed in a center portion of the insulating washer 57. The diameters of the holes 56a and 57a are substantially equal to the diameters of the holes 50a and 50b of the insulating sheet 50, and thus are slightly larger than the outer diameter of the conductive member.

An insulating sheet 58 is provided between the bus bar 36U and the branch bus bar 41V to insulate the branch bus bar 41V from the bus bar 36U. A hole 58a is formed in the insulating sheet 58. An insulating sheet 59 is provided between the bus bar 36V and the branch bus bar 42U to insulate the branch bus bar 42U from the bus bar 36V. A hole 59a is formed in the insulating sheet 59. The diameters of the holes 58a and 59a are substantially equal to the diameters of the holes 50a and 50b of the insulating sheet 50, and thus are slightly larger than the outer diameter of the conductive member. The insulating washers 56 and 57 and the insulating sheets 58 and 59 are also formed of, for example, an insulating material such as epoxy glass or Teflon (registered trademark).

A hole 41Ua is formed in the branch bus bar 41U, a hole 41Va is formed in the branch bus bar 41V, a hole 42Ua is formed in the branch bus bar 42U, and a hole 42Va is formed in the branch bus bar 42V. The shapes of the holes 41Ua, 41Va, 42Ua, and 42Va are circular, and the diameters thereof are slightly larger than the outer diameter of the conductive member.

When viewed from the lamination direction of the bus bars 36U and 36V, the hole 41Va of the branch bus bar 41V, the hole 58a of the insulating sheet 58, the hole 56a of the insulating washer 56, the hole 50a of the insulating sheet 50, the hole 36Vb of the bus bar 36V, and the hole 42Va of the branch bus bar 42V are arranged at the same position as each other, and the conductive member 37V passes through these holes. Both end portions of the conductive member 37V are screwed by a pair of nuts 61a and 61b. The branch bus bar 41V and the branch bus bar 42V are biased in directions approaching each other by the pair of nuts 61a and 61b. In FIG. 10, the nut 61a is not illustrated.

As a result, the bus bar 36V is in contact with the bent end portion of the branch bus bar 42V and is connected to the branch bus bar 42V. The bus bar 36V is connected to the conductive member 37V via the inner surface of the hole 36Vb, the inner surface of the hole 42Va of the branch bus bar 42V and the nut 61b. The conductive member 37V may be welded to the bus bar 36V. The conductive member 37V is connected to the branch bus bar 41V via the inner surface of the hole 41Va of the branch bus bar 41V and the nut 61a. As a result, the bus bar 36V is connected to the branch bus bar 42V and the branch bus bar 41V On the other hand, the bus bar 36U is insulated from the bus bar 36V by the insulating sheet 50, is insulated from the conductive member 37V by the insulating washer 56, and is insulated from the branch bus bar 41V by the insulating sheet 58. Therefore, the bus bar 36U is insulated from the branch bus bars 41V and 42V.

When viewed from the lamination direction of the bus bars 36U and 36V, the hole 42Ua of the branch bus bar 42U, the hole 59a of the insulating sheet 59, the hole 57a of the insulating washer 57, the hole 50b of the insulating sheet 50, the hole 36Ub of the bus bar 36U, and the hole 41Ua of the branch bus bar 41U are arranged at the same position, and the conductive member 37U passes through these holes. Both end portions of the conductive member 37U are screwed by a pair of nuts 62a and 62b. The branch bus bar 41U and the branch bus bar 42U are biased in directions approaching each other by the pair of nuts 62a and 62b. In FIG. 10, the nut 62a is not illustrated.

As a result, the bus bar 36U is in contact with the bent end portion of the branch bus bar 41U and is connected to the branch bus bar 41U. The bus bar 36U is connected to the conductive member 37U via the inner surface of the hole 36Ub, the inner surface of the hole 41Ua of the branch bus bar 41U, and the nut 62a. The conductive member 37U may be welded to the bus bar 36U. The conductive member 37U is connected to the branch bus bar 42U via the inner surface of the hole 42Ua of the branch bus bar 42U and the nut 62b. As a result, the bus bar 36U is connected to the branch bus bar 41U and the branch bus bar 42U.

On the other hand, the bus bar 36V is insulated from the bus bar 36U by the insulating sheet 50, is insulated from the conductive member 37U by the insulating washer 57, and is insulated from the branch bus bar 42U by the insulating sheet 59. Therefore, the bus bar 36U is insulated from the branch bus bars 41U and 42U.

In this manner, the U terminals can be taken out to both sides in the lamination direction of the bus bars 36U and 36V via the conductive member 37U, and the V terminals can be taken out to both sides in the lamination direction of the bus bars 36U and 36V via the conductive member 37V. As a result, the output unit 21 and the output unit 22 can be arranged on both sides in the lamination direction of the bus bars 36U and 36V At this time, in the lamination direction of the bus bars 36U and 36V, the bus bars 36U and 36V are arranged between the output unit 21 and the output unit 22.

With the similar configuration, the U terminal can be taken out to both sides in the lamination direction of the bus bars 36U and 36V via the conductive member 38U, and the V terminal can be taken out to both sides in the lamination direction of the bus bars 36U and 36V via the conductive member 38V. As a result, the output unit 23 and the output unit 24 can be arranged on both sides in the lamination direction of the bus bars 36U and 36V. At this time, in the lamination direction of the bus bars 36U and 36V, the bus bars 36U and 36V are arranged between the output unit 23 and the output unit 24.

Configurations, operations, and effects other than those described above in the present embodiment are similar to those in the first embodiment described above.

The foregoing embodiments are examples embodying the present invention, and the present invention is not limited to these embodiments. For example, in each of the above-described embodiments, addition, deletion, or modification of some components is also included in the present invention. For example, the external load to which the power supply device 1 or 2 supplies high frequency power is not limited to the matching unit of the induction heating device. In each of the above-described embodiments, an example in which the conductive member is a round bar material is illustrated, but the shape of the conductive member is not limited thereto. The conductive member may be, for example, a stud bolt having threads formed at both ends, or may have another shape. Further, the insulating member is not limited to the insulating washer. Furthermore, the shape of the branch bus bar is not limited to the above-described example. Another conductive member may be connected between the branch bus bar and the output unit.

The present invention can be used, for example, in a power supply device that supplies a high frequency large current, and can be used, for example, in a power supply device of an induction heating device.

What is claimed is:

1. A power supply device, comprising:
a first output unit that outputs a first alternating current;
a second output unit that outputs a second alternating current; and
a current combining unit that combines the first alternating current and the second alternating current,
wherein
the current combining unit includes:
a first bus bar;
a second bus bar;
a first conductive member that is welded to a first surface of the first bus bar and is connected to the first output unit;
a second conductive member that is welded to a second surface of the first bus bar, penetrates the second bus bar, and is connected to the second output unit;
a third conductive member that is welded to a first surface of the second bus bar and is connected to the second output unit; and
a fourth conductive member that is welded to a second surface of the second bus bar, penetrates the first bus bar, and is connected to the first output unit, and
the second surface of the first bus bar faces the second surface of the second bus bar.

2. The power supply device according to claim 1, wherein the first conductive member overlaps the second conductive member, and the third conductive member overlaps the fourth conductive member, when viewed from a direction in which the first bus bar and the second bus bar are laminated.

3. The power supply device according to claim 1, wherein the current combining unit further includes:
a first insulating member; and
a second insulating member, a first hole is formed in the first bus bar,
the first insulating member is disposed in the first hole,
a second hole is formed in the first insulating member,
a third hole is formed in the second bus bar,
the second insulating member is disposed in the third hole,
a fourth hole is formed in the second insulating member,
the second conductive member penetrates the fourth hole, and
the fourth conductive member penetrates the second hole.

4. A power supply device, comprising:
a first output unit that outputs a first alternating current;
a second output unit that outputs a second alternating current; and
a current combining unit that combines the first alternating current and the second alternating current,
wherein
the current combining unit includes:
a first bus bar;
a second bus bar;
a first conductive member that penetrates the first bus bar and the second bus bar and is connected to the first bus bar, the first output unit, and the second output unit; and
a second conductive member that penetrates the first bus bar and the second bus bar and is connected to the second bus bar, the first output unit, and the second output unit.

5. The power supply device according to claim 4, wherein the current combining unit further includes:
a first insulating member; and
a second insulating member,
a first hole and a second hole are formed in the first bus bar,
the first insulating member is disposed in the first hole,
a third hole is formed in the first insulating member,
a fourth hole and a fifth hole are formed in the second bus bar,
the second insulating member is disposed in the fourth hole,
a sixth hole is formed in the second insulating member,
the first conductive member penetrates the second hole and the third hole, and
the second conductive member penetrates the fifth hole and the sixth hole.

6. The power supply device according to claim 1, wherein the current combining unit further includes:
a first inductance adjustment unit that adds inductance to a current path between the first bus bar and the first output unit and a current path between the second bus bar and the first output unit; and
a second inductance adjustment unit that adds inductance to a current path between the first bus bar and the second output unit and a current path between the second bus bar and the second output unit.

7. The power supply device according to claim 1, wherein the first bus bar and the second bus bar are disposed between the first output unit and the second output unit in a direction in which the first bus bar and the second bus bar are laminated.

8. The power supply device according to claim 1, wherein the first output unit overlaps the second output unit when viewed from a direction in which the first bus bar and the second bus bar are laminated.

9. The power supply device according to claim 8, further comprising:
a third output unit that outputs a third alternating current; and
a fourth output unit that outputs a fourth alternating current,
wherein
the current combining unit combines the third alternating current and the fourth alternating current with the first alternating current and the second alternating current,
the third output unit overlaps the fourth output unit when viewed from a direction in which the first bus bar and the second bus bar are laminated, and
the first output unit overlaps the third output unit and the second output unit overlaps the fourth output unit when viewed from a direction in which the first bus bar and the second bus bar extend.

10. The power supply device according to claim 1, wherein
the first bus bar and the second bus bar are connected to a matching unit of an induction heating device.

* * * * *